US012803464B2

(12) United States Patent
Wu et al.

(10) Patent No.: US 12,803,464 B2
(45) Date of Patent: Nov. 17, 2026

(54) DROOP CONTROL METHOD FOR PARALLEL INVERTERS

(71) Applicant: Eaton Intelligent Power Limited, Dublin (IE)

(72) Inventors: Yiping Wu, Shen Zhen (CN); Wenting Huang, Shen Zhen (CN); Maoxing Lin, Shen Zhen (CN); Guosheng Ma, Shen Zhen (CN)

(73) Assignee: Eaton Intelligent Power Limited, Dublin (IE)

( * ) Notice: Subject to any disclaimer, the term of this patent is extended or adjusted under 35 U.S.C. 154(b) by 209 days.

(21) Appl. No.: 18/757,842

(22) Filed: Jun. 28, 2024

(65) Prior Publication Data

US 2025/0007424 A1 Jan. 2, 2025

(30) Foreign Application Priority Data

Jun. 30, 2023 (CN) ......................... 202310797206.0

(51) Int. Cl.
*H02M 7/493* (2007.01)

(52) U.S. Cl.
CPC .................................. *H02M 7/493* (2013.01)

(58) Field of Classification Search
CPC .................................................... H02M 7/493
See application file for complete search history.

(56) References Cited

U.S. PATENT DOCUMENTS 10,224,831 B1 * 3/2019 Hurtado ............... H03K 17/042
2019/0131888 A1 * 5/2019 Zhong ..................... H02M 1/08

FOREIGN PATENT DOCUMENTS

CN 109494789 A * 3/2019 ................ H02J 3/28
GB 2483879 A * 3/2012 ................ H02J 3/46

OTHER PUBLICATIONS

Qing-Chang Zhong, Wen-Long Ming, Yu Zeng;Self-Synchronized Universal Droop Controller, IEEE Access vol. 4, Nov. 18, 2016; pp. 7145-7153.*

Machine translation of CN109494789 by Clarivate Analytics, Mar. 2026, 7 pages.*

Qing-Chang Zhong, et al: "Robust Droop Controller for Accurate Proportional Load Sharing Among Inverters Operated in Parallel"; IEEE Transactions on Industrial Electronics, vol. 60, No. 4, Apr. 2013; p. 1281-1290.

(Continued)

*Primary Examiner* — Harry R Behm

(74) *Attorney, Agent, or Firm* — Stanek Lemon Crouse & Meeks, PA

(57) ABSTRACT

Provided is a droop control method for parallel inverters, including, for each inverter: performing proportional integral control on an RMS voltage error value and a power error value to obtain an integral error value; obtaining an RMS voltage target value based on the integral error value and a droop value of an output power of a corresponding inverter; converting the RMS voltage target value to an alternating current value to obtain an alternating current voltage reference value; and obtaining, based on the alternating current voltage reference value, a duty cycle for controlling an output of the corresponding inverter.

9 Claims, 5 Drawing Sheets

(56) References Cited

OTHER PUBLICATIONS

Sudheer Peddeeti, et al: "Effective power balancing and power quality enhancement in single-phase microgrid for remote areas with water pumping, battery storage and electronic load controller"; Electrical Engineering (2022) 104, pp. 83-96; https://doi.org/10.1007/s00202-021-01377-4.
Adam Milczarek, et al: "Proportional Reactive Power Sharing Algorithm in Islanded AC Microgrid"; 2015 IEEE.

* cited by examiner

DROOP CONTROL METHOD FOR PARALLEL INVERTERS

CROSS REFERENCE TO RELATED APPLICATION

This application claims priority to Chinese Application No. 202310797206.0, filed Jun. 30, 2023, the content of which is hereby incorporated herein by reference in its entirety.

TECHNICAL FIELD

The present disclosure relates to the field of control, and in particular, to a droop control system and control method for parallel inverters.

BACKGROUND

The parallel inverter technology aims to improve the power supply capacity and reliability of a system, and is mainly applied in the fields of static inverter (SIV), uninterruptible power supply (UPS), and distributed generation (DG). The parallel inverter technology includes a droop control method, which achieves parallel connection by detecting the output state of each inverter, does not rely on communication signals between inverters, and has high system reliability and wide application. However, the conventional droop control method adopts proportional droop control, which has an inherent contradiction between voltage steady-state error and steady-state power allocation error and a slow response speed. Therefore, a droop control method is needed to reduce voltage steady-state error and steady-state power allocation error, and to improve the response speed of droop control.

SUMMARY

In view of the foregoing problems of existing technologies, the present disclosure provides a droop control method for parallel inverters, including, for each inverter: performing proportional integral control on a root mean square (RMS) voltage error value and a power error value to obtain an integral error value; obtaining an RMS voltage target value based on the integral error value and a droop value of an output power of a corresponding inverter; converting the RMS voltage target value to an alternating current value to obtain an alternating current voltage reference value; and obtaining, based on the alternating current voltage reference value, a duty cycle for controlling an output of the corresponding inverter.

In one embodiment, the droop control method further includes: obtaining the RMS voltage error value based on an RMS voltage reference value and an RMS of an output voltage from the corresponding inverter.

In one embodiment, the droop control method further includes: obtaining the power error value based on an average power of all the parallel inverters and the output power of the corresponding inverter.

In one embodiment, the step of the proportional integral control includes: multiplying the RMS voltage error value by a voltage proportion coefficient to obtain a gain of the RMS voltage error value; multiplying the power error value by a power proportion coefficient to obtain a gain of the power error value; obtaining a sum error value based on the gain of the RMS voltage error value and the gain of the power error value; and integrating the sum error value to obtain the integral error value.

In one embodiment, the droop control method further includes: multiplying the output power of the corresponding inverter by a droop coefficient to obtain the droop value of the output power of the corresponding inverter.

In one embodiment, the droop control method further includes: multiplying the RMS voltage target value by a unit sine function with an amplitude of $\sqrt{2}$ to obtain the alternating current voltage reference value.

In one embodiment, the droop control method further includes: detecting the output voltage of the corresponding inverter through an RMS detector to obtain the RMS of the output voltage.

In one embodiment, the step of obtaining, based on the alternating current voltage reference value, a duty cycle for controlling an output of the corresponding inverter further includes: obtaining an alternating current voltage error value based on the alternating current voltage reference value and the output voltage from the corresponding inverter; performing proportional integral control on the alternating current voltage error value to obtain a current reference value; obtaining a current error value based on the current reference value and an output current from the corresponding inverter; and performing proportional integral control on the current error value to obtain the duty cycle.

The present disclosure further provides a computer-readable storage medium, including a computer program that can be executed by a processor to implement the steps of the foregoing droop control method for parallel inverters.

The present disclosure further provides an electronic device, including: one or more processors; and a memory, configured to store one or more executable instructions; the one or more processors are configured to implement the steps of the foregoing droop control method for parallel inverters by executing the one or more executable instructions.

The droop control system and control method in the present disclosure introduce an average active power loop to eliminate steady-state power allocation errors. In addition, the droop control does not use an RMS loop, which improves the response speed of droop control.

DETAILED DESCRIPTION

In order to make the objectives, technical solutions and advantages of the present disclosure clearer, the following will further describe the present disclosure in detail in conjunction with the accompanying drawings through specific embodiments. It should be noted that the embodiments provided in the present disclosure are for illustration purposes only and do not limit the scope of protection of the present disclosure.

Figure 1:
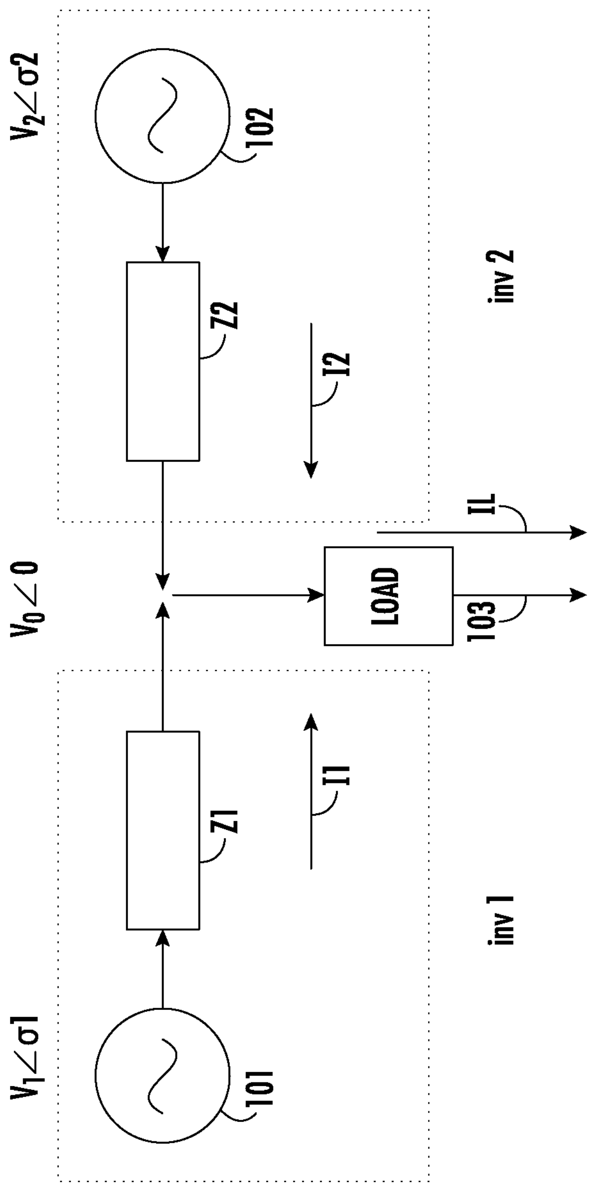
FIG. 1 illustrates an equivalent circuit of parallel inverters.

FIG. 1 illustrates an equivalent circuit of parallel inverters. Two inverters, inv1 and inv2, are connected in parallel to jointly supply power to load 103. Inverter inv1 is equivalent to power supply 101 and impedor Z1, the voltage of power supply 101 is V1<σ1, and the output current of inverter inv1 is I1. Inverter inv2 is equivalent to power supply 102 and impedor Z2, the voltage of inverter inv2 is V2<σ2, and the output current of inverter inv2 is I2. Inverter inv1 and inverter inv2 are connected in parallel to load 103 to jointly supply power to load 103, and the input voltage of load 103 is V0<0.

Although only 2 inverters are shown in FIG. 1, practical applications may include N parallel inverters, where N is an integer greater than 1. When the equivalent impedance of an inverter is purely resistive, the output power of the $i^{th}$ ($1 \le i \le N$) inverter is:

$$P_{oi} = \frac{v_0 v_i \cos\sigma_i - v_0^2}{Z_i} \tag{1}$$

Here, vi represents an amplitude of an equivalent power supply voltage of the ith inverter, oi represents a phase of the equivalent power supply voltage of the ith inverter, and Zi represents an equivalent impedance of the ith inverter.

With continued reference to FIG. 1, when Z1=Z2 and $\sigma_1=\sigma_2=0$, the following is obtained:

$$\Delta V = K_{V\_P} \cdot \Delta P \tag{2}$$

Here, ΔV=V1−V2 represents a voltage difference between equivalent power supplies of inverter inv1 and inverter inv2, ΔP=PO1−PO2 represents an output power difference between inverter inv1 and inverter inv2, and KV_P represents a voltage power proportion coefficient.

A droop control method is as follows:

$$V_{refi} = V_{noi} - K_{V\_droop} \cdot P_{oi} \tag{3}$$

Here, $V_{refi}$ represents a reference voltage for droop control, $V_{noi}$ represents an initial voltage for droop control, and $K_{v\_droop}$ represents a droop coefficient, which is a fixed value. In one embodiment, the droop coefficient may alternatively be adjusted for small-scale testing.

For a case of two inverters connected in parallel, $$V_{ref1} = V_{no1} - K_{V_{droop}} \cdot P_{o1} \tag{4}$$

$$V_{ref2} = V_{no2} - K_{V\_droop} \cdot P_{o2}$$

After the two equations are subtracted, the following is obtained:

$$\Delta V_{out} = -K_{V\_droop} \cdot \Delta P + \Delta V_n \tag{5}$$

Here, $\Delta V_{out}=V_{ref1}-V_{ref2}$ represents a difference between reference voltages of inverter inv1 and inverter inv2, and $\Delta V_n=V_{no1}-V_{no2}$ represents a difference between initial voltages of the two inverters. In one embodiment, the initial voltages of inverter inv1 and inverter inv2 for droop control are the same, both of which are 220V. In one embodiment, in an ideal state, the equivalent power supply voltage V1 of inverter inv1 is equal to its reference voltage $V_{ref1}$, and the equivalent power supply voltage V2 of inverter inv2 is equal to its reference voltage $V_{ref2}$.

Figure 2:
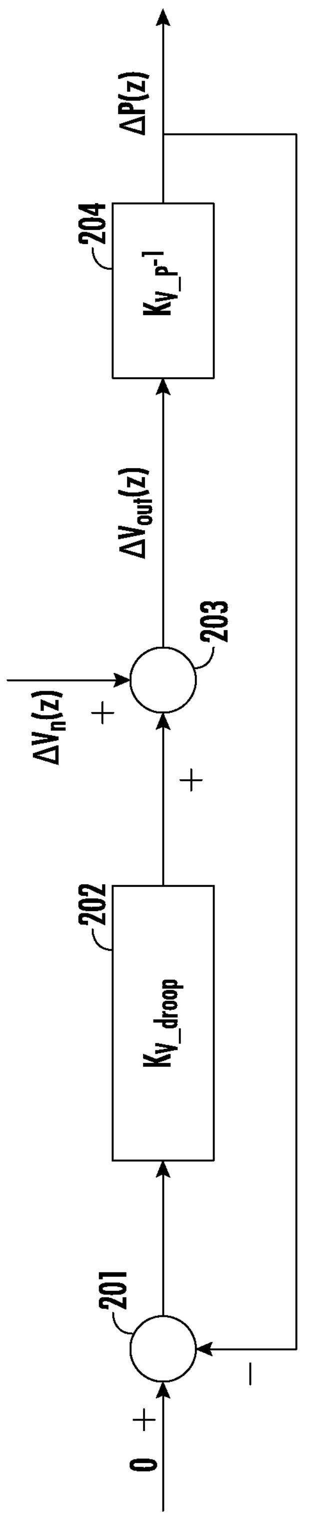
FIG. 2 illustrates an equivalent block diagram of Equation (5) in a discrete domain (z domain).

Based on Equations (2)-(5), a control system in a discrete domain (z domain) shown in FIG. 2 can be obtained, where z is a change operator. The control system includes a subtractor 201, a multiplier 202, an adder 203, and a multiplier 204. The subtractor 201 is configured to receive a power difference reference value 0 and an output power difference ΔP(z) of two inverters and subtract one from another to obtain an error value −ΔP(z). The multiplier 202 is configured to multiply the error value by a droop coefficient $K_{v\_droop}$ for output. The adder is configured to receive the output from the multiplier 202 and a difference $\Delta V_n$ (z) between initial voltages of two UPS and add the two to obtain a difference $\Delta V_{out}$ (z) between reference voltages of the two inverters. In an ideal state, $\Delta V_{out}$ (z) is equal to ΔV(z). The multiplier 204 is configured to multiply the difference $\Delta V_{out}(z)$ between the reference voltages of the two UPS by a reciprocal $K_{V\_P}^{-1}$ of a voltage power proportion coefficient KV_P and output the output power difference ΔP(z) of the two inverters.

Based on the system of FIG. 2, a steady-state power allocation error is calculated as follows:

$$e(\infty) = \frac{K_{V\_P}}{1 + K_{V\_droop} \cdot K_{V\_P}} \Delta V_n(z) \tag{6}$$

Here, the steady-state power allocation error is the difference between the output power of the two inverters, namely, ΔP(z). In a case of N parallel inverters, the steady-state power allocation error is a difference between output power of the current inverter and average output power of the N parallel inverters. From Equation (6), it can be seen that the larger the droop coefficient, the smaller the steady-state power allocation error.

Figure 3:
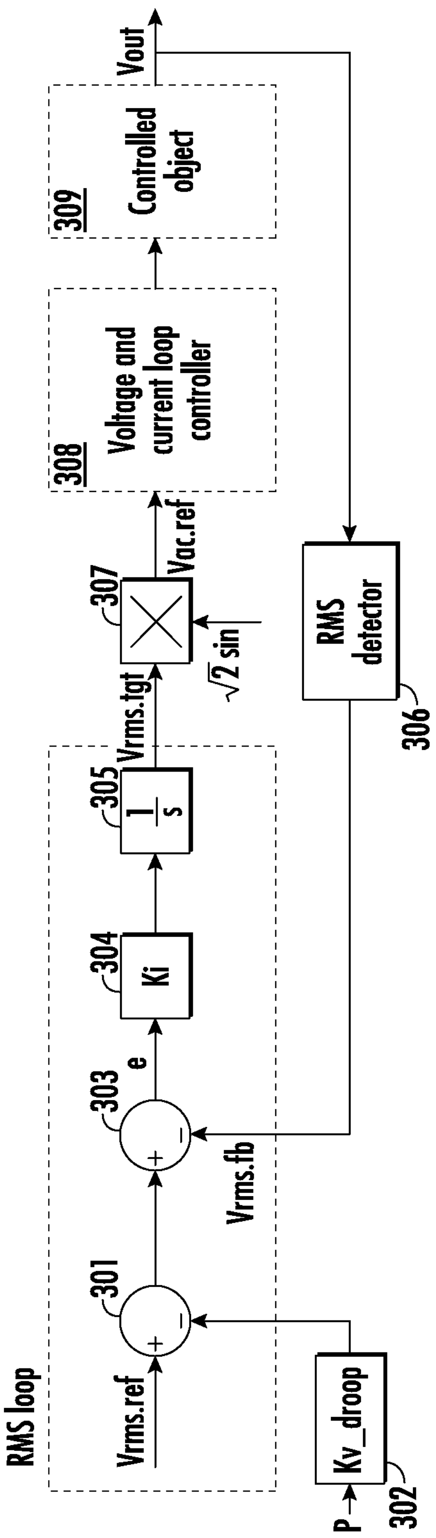
FIG. 3 (Prior Art)
FIG. 3 illustrates a schematic diagram of a droop control system for parallel inverters in an existing technology.

FIG. 3 illustrates a schematic diagram of a droop control system for parallel inverters in an existing technology. As shown in FIG. 3, the droop control system includes a root mean square (RMS) loop, power droop control, and a voltage and current loop controller 308. The power droop control includes a multiplier 302. The RMS loop includes a subtractor 301, a subtractor 303, a multiplier 304, and an integrator 305.

The multiplier 302 is configured to receive output power (active power) from an inverter (controlled object) 309, multiply the output power by a droop coefficient $K_{V\_droop}$, and output a droop value.

The subtractor 301 is configured to receive an RMS voltage reference value Vrms·ref and the droop value from the multiplier 302 and subtract one from another for output.

An RMS detector 306 is configured to receive an output voltage Vout from the inverter 309, detect an RMS of the output voltage Vout, and output a voltage feedback value Vrms·fb.

The subtractor 303 is configured to receive the output from the subtractor 301 and the voltage feedback value Vrms·fb from the RMS detector 306 and subtract one from another to output a voltage error value e.

The multiplier 304 is configured to receive the voltage error value e from the subtractor 303 and multiply the same by an integration coefficient Ki for output.

The integrator 305 is configured to receive the output from the multiplier 304, integrate the output, and then output an RMS target value Vrms·tgt.

The multiplier 307 is configured to receive the RMS target value Vrms·tgt from the integrator 305, multiply the Vrms·tgt by a unit sine function sin with an amplitude of $\sqrt{2}$, and output an alternating current voltage reference value Vac·ref.

Figure 4:
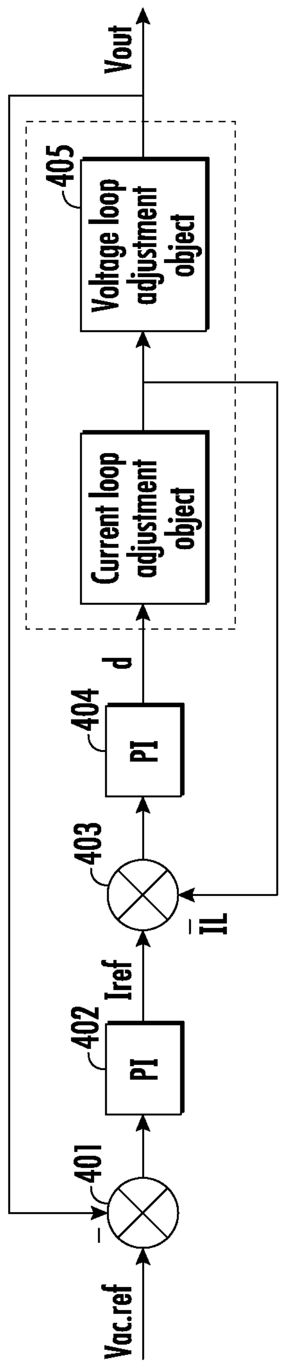
FIG. 4 illustrates a schematic diagram of a voltage and current loop controller according to an embodiment of the present disclosure.

The alternating current voltage reference value Vac·ref is input into the voltage and current loop controller 308 to obtain a duty cycle for controlling the inverter 309. The voltage and current loop controller 308 is a well-known technology in this field. For ease of understanding, FIG. 4 illustrates a schematic diagram of a voltage and current loop controller according to an embodiment of the present disclosure. It should be understood that the voltage and current loop controller in FIG. 4 is only an example and does not constitute a limitation to the present disclosure.

As shown in FIG. 4, the voltage and current loop controller includes a subtractor 401, a proportional integral controller 402, a subtractor 403, and a proportional integral controller 404. The subtractor 401 is configured to receive the alternating current voltage reference value Vac·ref from the droop control system shown in FIG. 3 and an output voltage Vout from an inverter 405, and subtract one from another to output an alternating current voltage error value. The proportional integral controller 402 is configured to receive the alternating current voltage error value from the subtractor 401, perform proportional integral control on the alternating current voltage error value, and then output a current reference value Iref. The subtractor 403 is configured to receive the current reference value Iref from the proportional integral controller 402 and output current IL from the inverter 405, and subtract one from another to output a current error value. The proportional integral controller 404 is configured to receive the current error value from the subtractor 403, perform proportional integral control on the current error value, and then output a duty cycle d. The duty cycle d is input into the inverter 405 to control the output voltage Vout and output current IL of the inverter 405.

The droop control method in the above embodiment adds the droop value calculated by multiplying the output active power P of the inverter by the droop coefficient Ky droop to the RMS voltage reference value Vrms·ref of the inverter RMS loop. The obvious defect of this method is steady-state error, and because droop control also uses the RMS loop, the response speed of droop control is affected. The steady-state error is a difference between the output voltage of the inverter and the alternating current voltage reference value Vac·ref (namely, target voltage) in a steady state. The larger the droop coefficient, the larger the steady-state error, but the larger the droop coefficient, the smaller the steady-state power allocation error. In addition, the foregoing droop control method is proportional control, so the steady-state power allocation error cannot be eliminated.

Figure 5:
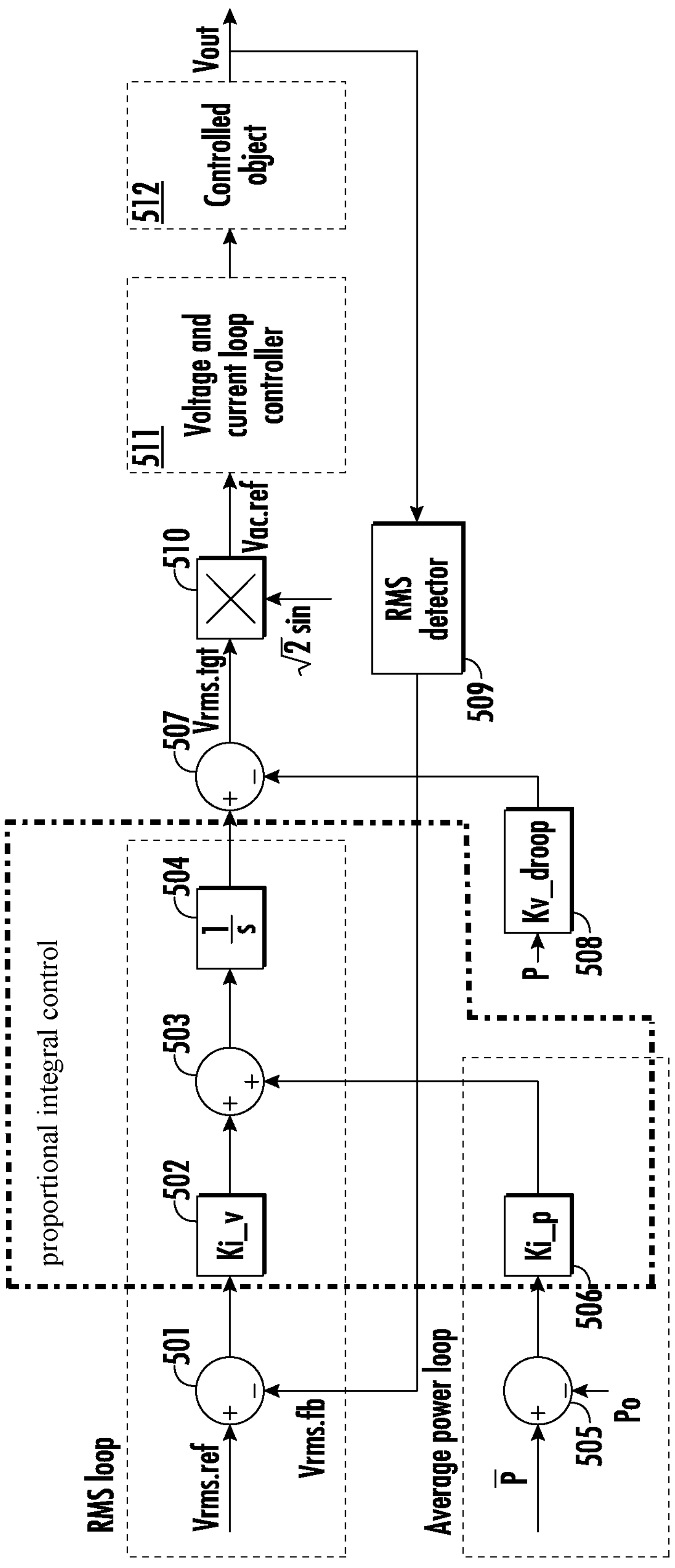
FIG. 5 illustrates a schematic diagram of a droop control system for parallel inverters according to an embodiment of the present disclosure.

FIG. 5 illustrates a schematic diagram of a droop control system for parallel inverters according to an embodiment of the present disclosure. The droop control system is used for controlling output power of a current inverter, so that all parallel inverters have nearly the same output power. As shown in FIG. 5, the droop control system includes an RMS loop, an average power loop, power droop control, and a voltage and current loop controller 511.

The average power loop includes a subtractor 505 and a multiplier 506. The subtractor 505 is configured to receive average active power $\overline{P}$ of all parallel inverters and an output active power Po of the current inverter and subtract one from another to output a power error value. The multiplier 506 is configured to receive the power error value from the subtracter 505, multiply the power error value by a power proportion coefficient Ki_p, and output a gain of the power error value. The multiplier 506 may alternatively be omitted, and in this case, the power proportion coefficient Ki_p is 1.

The RMS loop includes an RMS detector 509, a subtractor 501, a multiplier 502, an adder 503, and an integrator 504. The RMS detector 509 is configured to receive an output voltage Vout from an inverter 512, detect an RMS of the voltage, and output an RMS voltage feedback value Vrms·fb. The subtractor 501 is configured to receive an RMS voltage reference value Vrms·ref and the RMS voltage feedback value Vrms·fb from the RMS detector 509, and subtract one from another to output an RMS voltage error value. The multiplier 502 is configured to receive the RMS voltage error value from the subtractor 501, multiply the RMS voltage error value by a voltage proportion coefficient Ki_v, and output a gain of the RMS voltage error value. The multiplier 502 may alternatively be omitted, and in this case, the voltage proportion coefficient Ki_v is 1. The adder 503 is configured to receive the gain of the RMS voltage error value from the multiplier 502 and the gain of the power error value from the multiplier 506, and add the gains to output a sum error value. The integrator 504 is configured to receive the output from the adder 503, integrate the output, and output an integral error value. In one embodiment, the RMS can be directly calculated by the output voltage Vout of the inverter, that is, the RMS detector 509 can be omitted.

The power droop control includes: a multiplier 508, configured to receive an output power (active power) from the inverter, multiply the output power by a droop coefficient $K_{V\_droop}$, and output a power droop value.

A subtractor 507, configured to receive the integral error value from the integrator 504 and the power droop value from the multiplier 508, and subtract one from another to output an RMS voltage target value Vrms·tgt.

A multiplier 510, configured to convert the RMS of the voltage into an alternating current voltage value, receive the RMS voltage target value Vac·tgt from the subtractor 507, multiply the Vac·tgt by a unit sine function sin with an amplitude of $\sqrt{2}$, and output an alternating current voltage reference value Vac·ref.

The alternating current voltage reference value Vac·ref is input into the voltage and current loop controller 511 to obtain a duty cycle for controlling the inverter 512. The voltage and current loop controller 511 can be seen in FIG. 4.

In this embodiment, integral parts of the RMS loop and the average active power loop share one integral accumulation variable, so that both the RMS loop and the average power loop can reach a steady equilibrium state. If the two integral parts are operated separately, they will affect each other, making it impossible to reach the steady equilibrium state.

In another embodiment, the adder 503 may be omitted, and proportional integral control is performed on the RMS voltage error value and the output power error value respectively before being output to the subtractor 507.

The droop control method in the above embodiment adds the output of the RMS loop to the power droop value, and introduces the average power loop to eliminate the steady-state power allocation error. The following specifically describes the reason of introducing the average power loop to eliminate the steady-state power allocation error. The foregoing droop method using the average active power loop may be described as the following equation:

$$V_{refi}(k+1) = V_{noi} - K_{V\_droop} \cdot P_{oi}(k) - K_{i\_p} \cdot \sum_{n=1}^{k} (P_{oi}(n) - \overline{P}) \quad (7)$$

Here, $V_{refi}(k+1)$ represents a reference voltage for droop control on the ith inverter at time k+1, and $P_{oi}(k)$ represents output power of the ith inverter at time k.

Figure 6:
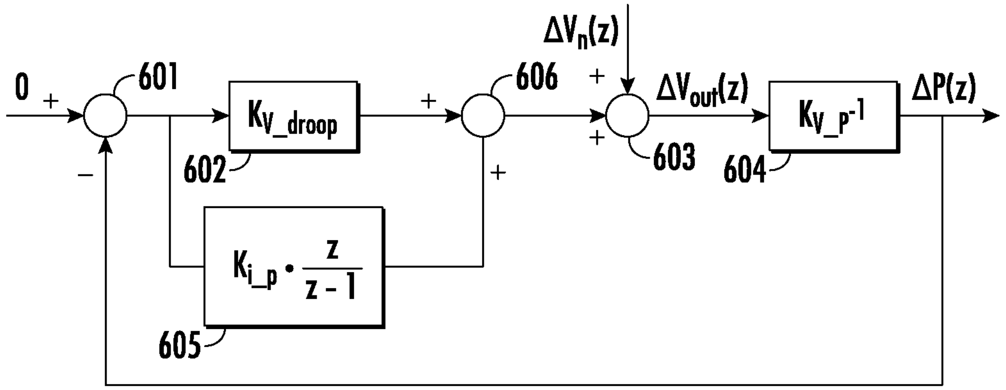
FIG. 6 illustrates an equivalent block diagram of Equation (7) in a discrete domain (z domain).

Equation (7) is equivalent to the block diagram shown in FIG. 6. The block diagram shown in FIG. 6 differs from FIG. 2 in an integrator 605 and an adder 606. The integrator 605 is configured to receive a power difference error value $-\Delta P(z)$, integrate it and output, where an integration coefficient is Ki_p. The adder 606 is configured to receive the output from the multiplier 602 and the output from the integrator 605, add them and output to the adder 603.

Based on Equation (7) and the block diagram shown in FIG. 6, a steady allocation power error is calculated as follows:

$$e(\infty) = \lim_{z \to 1} \frac{Kv_p}{1 + \left(Kv_{droop} + Ki_p * \frac{z}{z-1}\right) * Kv_p} \Delta Vn(z) = 0 \quad (8)$$

From FIG. 6 and Equation (8), by adding an integral part before disturbing $\Delta Vn(z)$, the average active power loop can eliminate the power allocation error, that is, in this system, the steady-state power allocation error e (∞) can approach 0.

Figure 7:
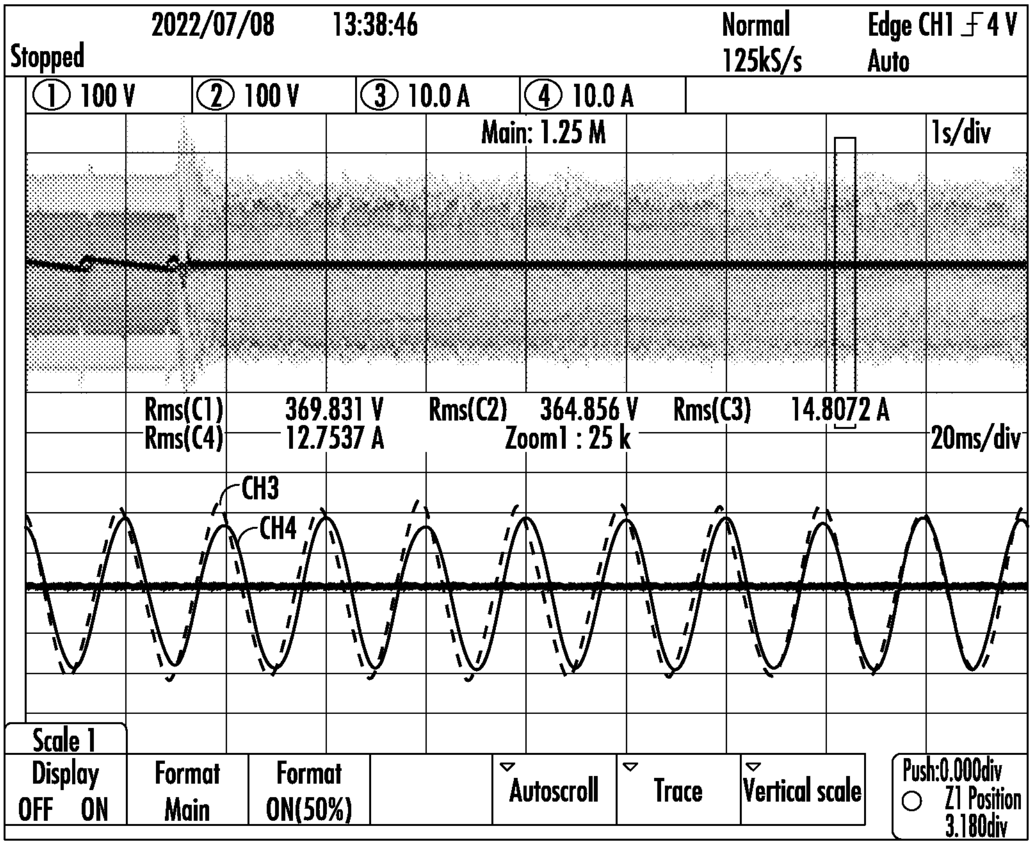
FIG. 7 (Prior Art)
FIG. 7 illustrates experimental results of a droop control method in an existing technology.

FIG. 7 illustrates experimental results of a droop control method in an existing technology. The load is R, curve CH3 represents output current of inverter 1, and curve CH4 represents output current of inverter 2. From FIG. 7, it can be seen that the power allocation error is large and cannot meet practical application requirements.

Figure 8:
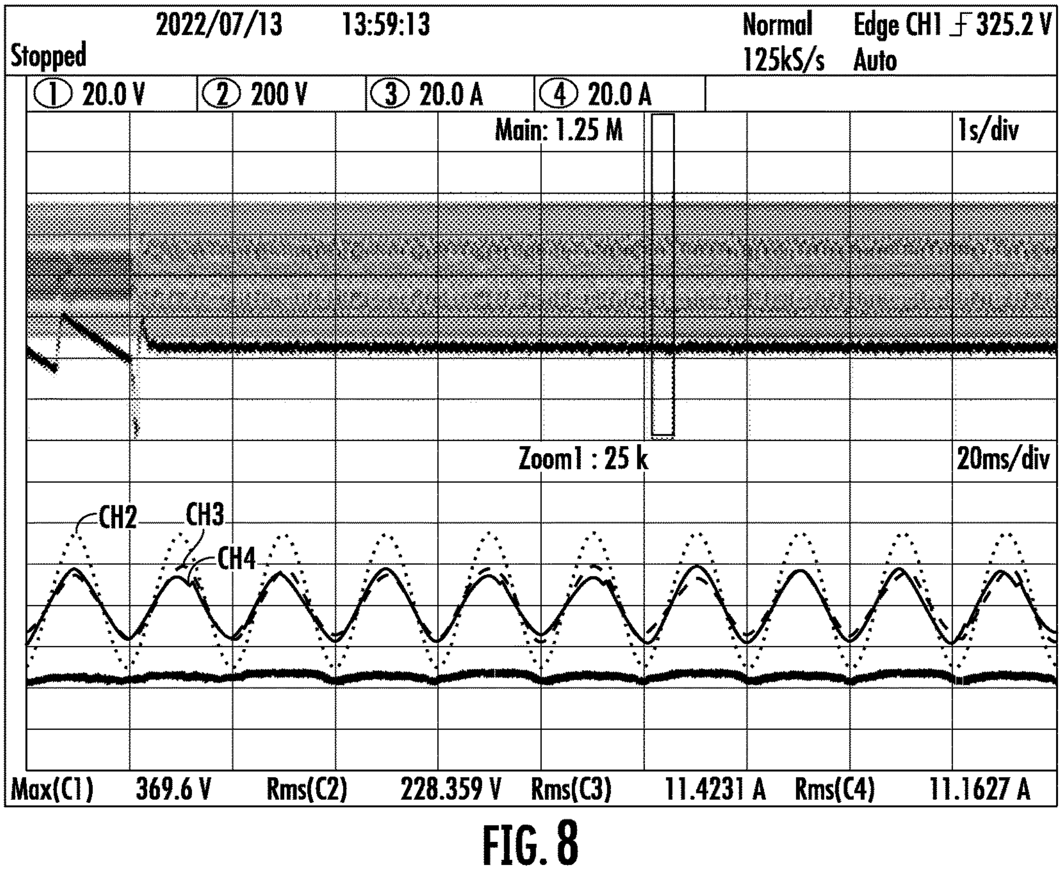
FIG. 8 illustrates experimental results of a droop control method according to the present disclosure.

FIG. 8 illustrates experimental results of a droop control method according to the present disclosure. The load is R, curve CH2 represents output voltage of an inverter, curve CH3 represents output current of inverter 1, and curve CH4 represents output current of inverter 2. From FIG. 8, it can be seen that the output voltage of the inverter is close to an alternating current voltage reference value, and the power distribution error is small, which meets practical application requirements.

Figure 9:
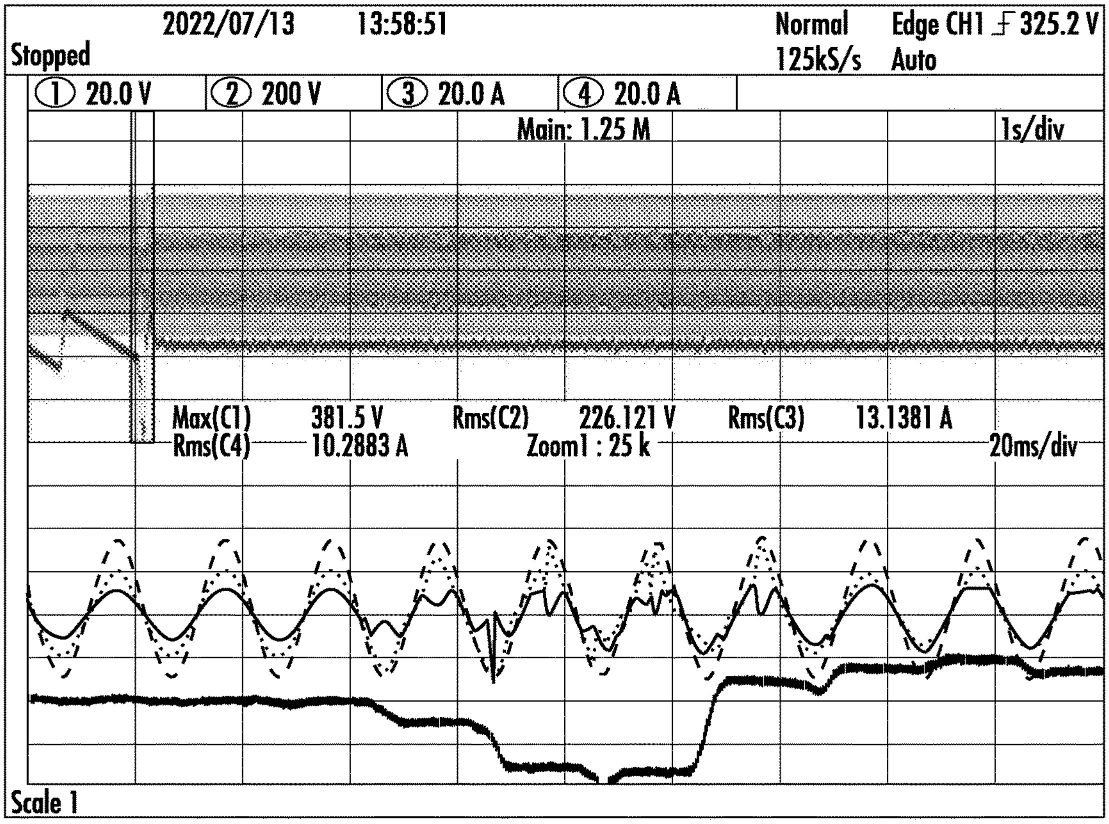
FIG. 9 illustrates an instantaneous waveform of UPS switching from a bypass mode to an on-line mode under the droop control method according to the present disclosure.

FIG. 9 illustrates an instantaneous waveform of UPS switching from a bypass mode to an on-line mode under the droop control method according to the present disclosure. From FIG. 9, it can be seen that the inverters enter a steady state after approximately four waveform cycles, and in these adjusted waveform cycles, the difference in current between the two inverters is within an acceptable range.

Although the droop control system and control method in the present disclosure are described in detail using active power as an example in the above embodiments, the present disclosure is not limited thereto. The foregoing droop control system and control method can also be used for controlling reactive power.

For ease of understanding, the above embodiments are described in a form of hardware systems. However, those skilled in the art should understand that the adder, subtractor, multiplier, integrator, proportional integral controller, voltage and current loop controller, and the like in the above embodiments can all be implemented as software and/or hardware.

Based on the above embodiments, the present disclosure further provides a droop control method for parallel inverters, including: performing proportional integral control on a root mean square (RMS) voltage error value and a power error value to obtain an integral error value; obtaining an RMS voltage target value based on the integral error value and a droop value of output power of an inverter; converting the RMS voltage target value to an alternating current value to obtain an alternating current voltage reference value; and obtaining, based on the alternating current voltage reference value, a duty cycle for controlling output of the inverter.

The droop control system and control method in the present disclosure introduce an average active power loop to eliminate steady-state power allocation errors. In addition, the droop control does not use an RMS loop, which improves the response speed of droop control.

Although the present disclosure is described through preferred embodiments, the present disclosure is not limited to the embodiments described herein, but further includes various changes and variations made without departing from the scope of the present disclosure.

What is claimed is:

1. A droop control method for parallel inverters, comprising, for each inverter:

performing proportional integral control on a root mean square (RMS) voltage error value and a power error value to obtain an integral error value;

obtaining an RMS voltage target value based on the integral error value and a droop value of an output power of a corresponding inverter;

converting the RMS voltage target value to an alternating current value to obtain an alternating current voltage reference value;

obtaining, based on the alternating current voltage reference value, a duty cycle for controlling an output of the corresponding inverter; and obtaining the power error value based on an average power of all the parallel inverters and the output power of the corresponding inverter.

2. The droop control method for parallel inverters according to claim 1, wherein the droop control method further comprises: obtaining the RMS voltage error value based on an RMS voltage reference value and an RMS of an output voltage from the corresponding inverter.

3. The droop control method for parallel inverters according to claim 2, wherein the droop control method further comprises: detecting the output voltage of the corresponding inverter through an RMS detector to obtain the RMS of the output voltage.

4. The droop control method for parallel inverters according to claim 1, wherein the step of the proportional integral control comprises:

multiplying the RMS voltage error value by a voltage proportion coefficient to obtain a gain of the RMS voltage error value;

multiplying the power error value by a power proportion coefficient to obtain a gain of the power error value;

obtaining a sum error value based on the gain of the RMS voltage error value and the gain of the power error value; and integrating the sum error value to obtain the integral error value.

5. The droop control method for parallel inverters according to claim 1, wherein the droop control method further comprises: multiplying the output power of the corresponding inverter by a droop coefficient to obtain the droop value of the output power of the corresponding inverter.

6. The droop control method for parallel inverters according to claim 1, wherein the droop control method further comprises: multiplying the RMS voltage target value by a unit sine function with an amplitude of $\sqrt{2}$ to obtain the alternating current voltage reference value.

7. The droop control method for parallel inverters according to claim 1, wherein the step of obtaining, based on the alternating current voltage reference value, a duty cycle for controlling an output of the corresponding inverter further comprises:

obtaining an alternating current voltage error value based on the alternating current voltage reference value and the output voltage from the corresponding inverter;

performing proportional integral control on the alternating current voltage error value to obtain a current reference value;

obtaining a current error value based on the current reference value and an output current from the corresponding inverter; and performing proportional integral control on the current error value to obtain the duty cycle.

8. A non-transitory computer-readable storage medium, comprising a computer program that can be executed by a processor to implement the steps of the method of claim 1.

9. An electronic device, comprising:

one or more processors; and a memory, configured to store one or more executable instructions;

the one or more processors are configured to implement the steps of the method according to claim 1 by executing the one or more executable instructions.

* * * * *